Patented Nov. 3, 1942

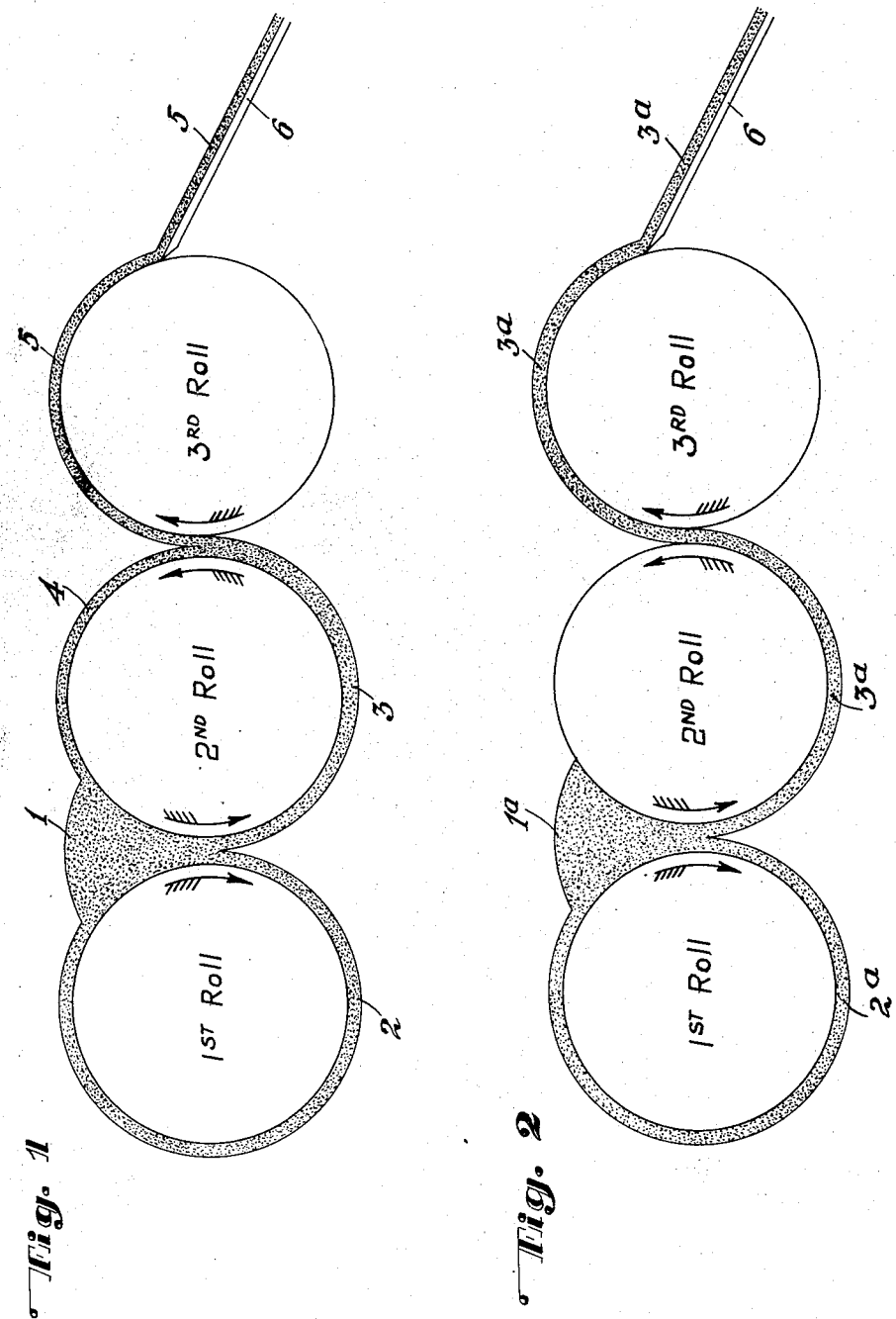

2,301,142

UNITED STATES PATENT OFFICE 2,301,142

COMPOSITION FOR SPEEDING UP THE MAKING OF PIGMENT PASTES

Leo Roon, South Orange, and Arthur Minich, East Orange, N. J., assignors to Nuodex Products Co., Inc., Elizabeth, N. J., a corporation of New York Original application October 5, 1939, Serial No. 298,156. Divided and this application October 27, 1939, Serial No. 301,601

1 Claim. (Cl. 260—752)

This invention relates to the incorporation of pigments into vehicles for the purpose of producing pigmented compositions for use in paints, undercoaters, primers, putties, enamels, lacquers, inks, linoleums, etc.

The object of this invention is, generally speaking, to facilitate and expedite the distribution of pigments in vehicles, for the purposes stated.

It is well known that opaque film-forming compositions, as a rule, should carry considerable percentages of finely distributed pigment particles. Where the coating material is applied or used for protective or decorative purposes, the optimum performance of such products can only be achieved when the pigment is in a state of fine division and well and uniformly distributed throughout the carrier vehicle, for only then will the deposited coating film be homogeneous and thoroughly satisfactory.

In the paint industry, for example, it has long been the practice to mix the pigment with a quantity of the vehicle and to thereafter subject such mixture to the grinding action of mills, such as pebble mills, roller-mills, Burrstone mills, etc. to incorporate the pigment in the vehicle, but, even with the best apparatus, this operation is relatively slow and expensive. Prior to the present invention, there has been an almost universal belief that the distribution of pigments in vehicles is primarily dependent upon the wetting of the pigment with the vehicle. Consequently much work has been done to increase the wetting property of vehicles through the employment of so-called wetting agents, which operate by reduction in interfacial or surface tension between the pigment and the vehicle.

Profound study of this situation, including consideration of almost one hundred different wetting agents of every type known to the industry, disclosed that the effect of these wetting agents upon the pigment-vehicle system, consisting of the pigment and the vehicle, is dependent, very largely, upon variations in any one or more of the three parts of the system, viz., the pigment, the vehicle and the wetting agent. For example, with a specific pigment, such as iron blue or Prussian Blue and a specific vehicle, such as a resin solution, one wetting agent assisted the distribution of the pigment in the vehicle, whereas another wetting agent, when used in the same pigment-vehicle system, did not operate at all. Likewise, if we took a wetting agent which assisted in the case of the Prussian Blue resin solution, and changed the pigment, to, e. g., French ochre with the same resin solution, we found that the distribution of the pigment particles was not helped and in some instances was actually retarded.

After thorough correlation of the laboratory work covering this large number of wetting agents and a large variety of pigments and vehicles, the entire situation was so confusing that it was impossible to draw any conclusion which would point to the practical use of any one group or type of wetting agent for universal use. When these results were communicated to a group of paint and varnish production men, they were definitely of the opinion that a universal wetting agent, while highly desirable, seemed impossible of achievement and that it would be, in the future, as it had been in the past, necessary to use an appropriately selected wetting agent for each type of group of pigments and each type or group of vehicles, or both, the total of which runs into innumerable combinations. We found, from our survey of the industry, that those skilled in the art were searching for and badly needed something which would have universal application and which, when added to the pigment-vehicle systems generally used in the paint and varnish industry and in the ink, linoleum and allied fields, would substantially improve the production facility, without sacrifice of fineness of distribution and without substantially changing the character of standard finished products. The primary object of the invention therefore was to find that something, and prolonged research was carried out along various avenues of approach.

We discovered that the best apparatus available was not functioning with full efficiency because the pigment of the pigment-vehicle system had so much inherent mobility that much of the force applied thereto (as by grinding rolls) was dissipated and lost and only a part thereof was actually applied to do the work desired. We felt that, if such apparatus, acting with partial efficiency, could produce a given product in a predetermined time cycle, the same apparatus, acting with greater efficiency, should be able to yield substantially increased production, without sacrifice of fineness. Likewise we felt that with efficiency in grinding it would be possible to obtain better distribution at equal to or better than normal rate of output.

Proceeding in accordance with these theories, we have definitely discovered that it is possible to so arrest the internal mobility of pigment agglomerates in a pigment-vehicle system as to gain increased utilization of grinding energy for the breaking up of such pigment agglomerates with an accompanying thorough distribution of the pigment particles throughout the vehicle. We have found that these results may be obtained by adding to a pigment-vehicle system, prior to grinding, a composition which we will hereinafter refer to as a grinding aid. This composition comprises, generally speaking, the combination of a polymer and a wetting agent. We have used in this connection a solution of one or more xylol-soluble high molecular weight organic polymers selected from the group consisting of natural and synthetic rubber and for the wetting agent one must be employed which is capable of forming a homogeneous solution with the polymer constituent. There are numerous wetting agents, known as such in the paint, varnish and allied industries, which may be successfully employed in this connection and many of these wetting agents we have used with highly satisfactory results in combination with the polymer, but in every case the wetting agent has been one capable of forming a homogeneous solution with the polymer. The ability of any particular wetting agent to form such a solution is readily determinable by those skilled in the art. Our tests showed that it was necessary to properly condition the polymer for use in the grinding aid composition and to employ such polymer, so conditioned, in a specified manner and in surprisingly small quantities so as not to materially change the constitution of the ultimate product, such as paint, etc.

We have thoroughly demonstrated that, when such a grinding aid composition is added in small percentages to a pigment-vehicle system to be ground, there results a more rapid distribution of the pigment in the vehicle and a marked increase in efficiency of the grinding operation with respect to increased output or better distribution of pigment particles, or both.

The present invention thus provides a method whereby the grinding of a particular pigment or pigments into a vehicle may be accomplished on any particular machine, such as a roller mill, in but a fraction of the time that the same pigment can be incorporated by the same mill without the employment of this invention. In other words, the present invention provides a simple, convenient and economical method which may be incorporated in prior practice on conventional machines, with material reduction of the time element in grinding and without appreciably altering the composition of the commercial products into which the pigment paste, thus produced, may be subsequently incorporated.

The following examples of grinding aids have been subjected to thorough tests and have been found to give highly practical and efficient results.

*Example I*

100 pounds of barium naphthenate are dissolved in 400 pounds of xylol. The solution is heated under partial vacuum to an elevated temperature, e. g., 200° F., and then there is introduced therein 300 pounds of crepe rubber. The mass is agitated for a period of approximately 8 hours with constant heating at approximately 200° F., although this is not critical, and a partial vacuum is preferably maintained. It is also desirable to inject, during the operation, a small quantity of an inert gas such as nitrogen so as to minimize oxidation. We have found, that a pale color is best preserved by minimizing air during the manufacturing process. After the above stated period has elapsed, the total solid content of the mass is determined and adjusted to approximately 50 per cent.

To the chemist skilled in the art this process, as well as the product, are most unusual and unexpected because it is generally understood that both barium naphthenate and rubber, individually, tend to "body" materials and produce gels, whereas our tests show that, when used as stated, exactly the opposite result is obtained. In other words, the gell structure of the rubber is apparently peptized by barium naphthenate which, in itself, has gell-forming properties. This case of mutual peptization of two gell-forming materials was entirely unexpected and yet the product produced gave exceptionally high performance in the method of this invention, as will be presently explained.

*Example II*

100 pounds of aluminum naphthenate are dissolved in 400 pounds of xylol. The solution is heated under partial vacuum to an elevated temperature, e. g. 200° F., and then there is introduced therein 300 pounds of crepe rubber. The mass is agitated for a period of approximately 8 hours with constant heating at approximately 200° F., although this is not critical, and a partial vacuum is preferably maintained. We have found it desirable to minimize residual air during the manufacturing process as in Example I. After the above stated period has elapsed, the total solid content of the mass is determined, and adjusted to approximately 50 per cent.

In this case the results are even more striking than in the case of barium naphthenate because aluminum naphthenate is known as a bodying and gell-forming agent, commonly used as such in the paint and varnish industry. A 50 per cent dilution of the aluminum naphthenate alone in xylol represents an immobile gel and this is also true of a 50 per cent solution of rubber alone in xylol. The strange phenomenon, which we are unable to explain, is that, when these are brought together in the manner stated, a mobile liquid results apparently through a mutual liquefication of the respective gell structures through their conjoint cooperation and interaction one with the other.

*Example III*

200 pounds of an isobutylene polymer, having a molecular weight of approximately 14,200 is introduced into 800 pounds of xylol. The solution is then heated under partial vacuum to a temperature of about 200° F., and then there is added 200 pounds of zinc naphthenate prepared from refined naphthenic acid. The mass is then agitated for a period of approximately 4 hours, preferably in vacuuo, at a temperature of approximately 200° F., although this is not critical. At the conclusion of this period the total solid content of the mass is determined and adjusted to approximately 50 per cent.

*Example IV*

Following the general process steps of Example III, 100 pounds of an isobutylene polymer, of a molecular weight of approximately 80,000 is dissolved in 100 pounds of xylol. To this solution is then added 100 pounds of a 50 per cent solution of barium naphthenate in xylol to obtain 200 pounds of a composition of 50 per cent solids content.

Example V

| | Pounds |
|---|---|
| Crepe rubber | 75 |
| Glycol-di-naphthenate | 25 | are introduced into 100 pounds of hydrogenated petroleum hydocarbons, known under the commercial name of "Solvesso 2."

The mixture is caused to be agitated in a vacuum type kettle at a temperature of 200° F. It is desirable to inject, during the operation, a small quantity of an inert gase, such as nitrogen, so as to minimize oxidation.

After solution results, enough of the solvent is added to produce a yield of 200 pounds of the composition carrying 50 per cent total solids.

Example VI

| | Pounds |
|---|---|
| Para rubber | 208 |
| Barium naphthenate | 103 | are introduced into 311 pounds of xylol and the mass is subjected to protracted agitation at a temperature of 180° F. The process is carried out in a vacuum kettle. It is desrable to inject, during the operation, a small quantity of an inert gas, such as nitrogen, so as to minimize oxidation. After complete dissolution of the rubber and the barium naphthenate in the solvent is effected, there is then added sufficient xylol to produce a yield of 622 pounds of composition carrying approximately 50 per cent solids.

Example VII

| | Grams |
|---|---|
| Precipitated balata gum | 300 |
| Barium naphthenate | 100 | are dissolved in 400 grams of hydrogenated petroleum hydrocarbon, commercially known as "Solvesso 2," to yield 800 grams of a composition carrying 50 per cent total solids. It is desirable to inject, during the operation, a small quantity of an inert gas, such as nitrogen, so as to minimize oxidation, and the process is carried out as in Example I.

Example VIII

| | Grams |
|---|---|
| High viscosity chlorinated rubber | 300 |
| Barium naphthenate, prepared by vacuum process | 100 | are dissolved in high flash naphtha to produce a solution carrying 40 per cent total solids.

Example IX

| | Parts |
|---|---|
| Crepe rubber | 3 |
| Precipitated balata gum | 3 |
| Barium naphthenate | 2 |
| Toluol | 8 |

It is desirable to inject, during the operation, a small quantity of an inert gas, such as nitrogen, so as to minimize oxidation. The resultant composition carries 50 per cent solids. The process steps followed are those shown in Example I.

Example X

| | Pounds |
|---|---|
| Para rubber | 300 |
| Aluminum naphthenate | 50 |
| Barium naphthenate | 50 | are introduced into 400 pounds of linseed oil fatty acids and processed under thorough agitation in a vacuum kettle, preferably in the presence of an inert gas so as to minimize oxidation. There is thus produced 800 pounds of a composition which contains no volatile solvent and is especially suitable for use in certain inks where a volatile solvent is undesirable.

Example XI 100 pounds zinc resinate dissolved in 300 pounds xylol.

This operation is carried out in a reaction kettle equipped with an agitator which is closed and which is suitable for vacuum operation.

After solution has taken place, there is introduced therein 200 pounds of crepe rubber. Agitation is conducted and heat applied while vacuum is maintained. The process is carried out until the material has finally reached a viscosity of 60 seconds at 25° C. (This viscosity prevails on a Gardner mobilometer with a four hole disc and a 1000 gram weight.) The total yield of the composition is 600 pounds carrying 50 per cent total soids.

Example XII

| | Pounds |
|---|---|
| Linseed oil fatty acids | 250 |
| Crepe rubber | 750 |
| High-flash-naphtha | 1500 |

The operation is carried out as described in Example XI. The operation is continued until a viscosity of 90 seconds (same Gardner mobilomter at 25° C.) has been reached. The total yield of the composition obtained will be 2500 pounds carrying 40 per cent total solids.

Example XIII

| | Pounds |
|---|---|
| Glycol-di-naphthenate | 150 |
| Crepe rubber | 150 |
| Hydrogenated petroleum solvent, commercially sold under the name "Solvesso" | 700 |

The process is carried out as described in Example XI and is continued until a viscosity of 100 seconds (same Gardner mobilometer at 25° C.) is reached. The total yield will be 1000 pounds carrying 30 per cent total solids.

Example XIV

| | Pounds |
|---|---|
| Lead oleate | 200 |
| Crepe rubber | 600 |
| Toluol | 800 |

The process is carried out as described in Example XI until a viscosity of 20 seconds (same Gardner mobiliometer at 25° C.) is reached. Total yield is 1600 pounds carrying 50 per cent total solids.

Example XV

| | Pounds |
|---|---|
| Lecithin | 50 |
| Linseed oil fatty acids | 10 |
| Crepe rubber | 150 |
| Xylol | 630 |

The process is carried out as described in Example XI until a viscosity of 70 seconds (same Gardner mobilometer at 25° C.) is reached. Total yield of the composition is 840 pounds carrying 25 per cent total solids.

Example XVI

| | Pounds |
|---|---|
| Triethanolamine naphthenate | 200 |
| Crepe rubber | 400 |
| High-flash-naphtha | 400 |

The process is carried out as described in Example XI until a viscosity of 30 seconds (same Gardner mobilometer at 25° C.) is reached. Total yield of this composition is 1000 pounds carrying 60 per cent total solids.

*Example XVII*

|  | Pounds |
|---|---|
| Soya bean fatty acids | 50 |
| Calcium naphthenate | 100 |
| Crepe rubber | 300 |
| Hydrogenated petroleum solvent, commercially sold under the name "Solvesso" | 550 |

This process is identical as described in Example XI and is continued until a viscosity of 15 seconds (same Gardner mobilometer at 25° C.) has been reached. Total yield of this composition is 1000 pounds carrying 45% total solids.

In all of the foregoing examples, it is to be understood that, when some of the solvents are distilled off or evaporated during the processing, corresponding amounts of solvent are added at the completion of the work to compensate for this loss.

It will be noted that the various examples given specify compositions having a wide range of total solids. It is not our intention, however, to limit the composition of this invention to any particular percentage of total solids. The controlling factor is that there be sufficient solids present to yield a minimum viscosity of 50 centipoises.

In the foregoing examples, we have utilized barium naphthenate, aluminum naphthenate, glycol-di-naphthenate, zinc naphthenate, zinc resinate, linseed oil fatty acids, lead oleate, lecithin, triethanolamine naphthenate, soya bean fatty acids and calcium naphthenate alone, and in different combinations, as wetting agents in the grinding aid composition. We are aware, however, that many other wetting agents, known as such in the paint and varnish and allied industries, may be successfully employed in lieu of the barium and aluminum naphthenates. The wetting agent should, however, be substantially water-insoluble and non-volatile and must be capable of forming a homogeneous solution with the polymers with which they are used.

We have likewise replaced the metal salts of naphthenic acid with other acids and their metal salts and with the organic derivatives of such acids, either alone or in combinations thereof. Some of these replacements give highly satisfactory results, some were not as good as others.

Likewise, we have referred to certain illustrative solvents, viz., xylol, "Solvesso 2," high-flash-naphtha, and toluol. It will be understood that these solvents may be used interchangeably in the examples that we have given. Furthermore, we may use other solvents, such as are recognized in the art as solvents, volatile or non-volatile, for the materials to which we have referred in such example.

In certain of the foregoing examples the viscosities of the respective grinding aids have been given for we have found that viscosity plays an important part in the carrying out of the method of this invention. If the viscosity of the grinding aid is too low, little or no advantage is obtainable even though the same materials are employed. The particular constituents in practice determine the lower viscosity limit but commercial practice has shown the minimum limit of viscosity for practical results to be 50 centipoises at 25° C., although higher levels are generally conducive to superior results. The maximum viscosity limit is that the grinding aid is preferably sufficiently mobile to permit of distribution in the paste to be ground. These limits apply to all of the examples hereinbefore given.

All of the examples which have been given include the grinding aid which comprises a polymer and a wetting agent. As polymers, we have specifically referred to both natural and artificial or synthetic rubbers, and in this connection we consider balata gum as of the rubber family, and the isobutylene polymers as types of synthetic rubber.

We have found that all compositions as described in the foregoing examples have the effect of increasing grinding efficiency of pigment-vehicle systems to which they may be added. We have given definite proportions in the foregoing examples, but a study of these proportions has shown that they are susceptible of variation within reasonable limits without departing from this invention. In addition to the study of variations in proportion, with respect to performance, we have made many compositions other than as set forth in the foregoing illustrative examples, and in such other tests we have employed other forms or modifications of the polymer and it has been our observation that any rubber, natural or synthetic, or equivalent polymer, in order to be suitable for the purposes of this invention, should be of a kind which is soluble in xylol.

In carrying out the method of this invention, we use one or more of the grinding aids to which we have referred, by incorporating the same into a batch of pigment and vehicle to be ground. This batch may be prepared for grinding on a roll mill in the usual conventional way, namely, by premixing the pigment with the vehicle in the usual type of mixer, such as a pony type mixer. If it is to be ground in a pebble mill or ball mill the ingredients are introduced in the usual way into the mill. We have also noted that we obtained an unforseen result from the addition of the grinding aid of this invention to the pigment and vehicle prior to or during the pre-mixing of the ingredients preliminary to grinding for we have found that, when incorporated at this stage the presence of the grinding aid not infrequently cuts the pre-mixing time in half.

In the description as thus far advanced, we have set forth certain compositions which we have heretofore made, for use in paints, undercoaters, primers, putties, enamels, lacquers, inks, linoleums, etc. These compositions are thus used in practice to facilitate the distribution of pigments in vehicles in the various fields, but it is not feasible to herein enumerate all uses or all formulas with which these compositions are susceptible for use. We have, however, in order to show the breadth of scope and universal application of this invention, selected the composition descibed in Example I (hereinafter referred to as Composition I) and will, in the following examples, illustrate its usefulness in connection with various pigments, vehicles, and commercial grinding equipment in the production of various articles of commerce.

*Example XVIII.—White house paint*

|  | Pounds |
|---|---|
| Leaded zinc | 247 |
| Asbestine | 66 |
| Titanium dioxide | 87 |
| White lead | 384 |
| Bodied perilla oil | 25 |
| Raw linseed oil | 205 |

The above ingredients were first mixed to a uniform paste and then .4 per cent of Composition I, on the above weight, was added to the mixture and mixed for 3 minutes. Then the mass was fed to a 3 roll mill and it was found that the output was doubled, as against that obtained when the same batch was run without Composition I, and with the same fineness.

*Example XIX.—Green enamel*

350 pounds of light chrome green was added to 150 pounds varnish. According to prior practice it required one hour to grind this batch. We added 6 pounds of Composition I to a like batch and with the same mill speed and clearance on the same three-roll mill, obtained a like grind in 26 minutes.

*Example XX.—Gloss white enamel*

700 pounds mixed pigment, consisting of 80 per cent calcium base titanium oxide and 20 per cent treated whiting, were added to 280 pounds varnish. The grinding on a five-roll mill, without Composition I, produced 1307 pounds per hour. With the addition of 11 pounds of Composition I, to a like batch, production increased to 2450 pounds per hour.

*Example XXI.—White paint*

| | Pounds |
|---|---|
| Lithopone | 867 |
| Wood-fish stand oil | 433 |
| Total | 1300 |

5 roll mill

| Production: | Pounds per hour |
|---|---|
| Without Composition I | 975 |
| With 15 pounds Composition I | 2,900 |

*Example XXII.—Burnt umber in oil*

| | Pounds |
|---|---|
| Burnt umber | 170 |
| Oxide iron | 3 |
| Carbon black | 3 |
| Raw soya oil | 62 |
| Raw linseed oil | 62 |
| Total | 330 |

Ground on a 26 inch Burrstone mill.

| Production: | Pounds per hour |
|---|---|
| Without Composition I | 76 |
| With 3 pounds, 9 ounces of Composition I | 172 |

*Example XXIII.—Inexpensive white enamel*

160 pounds of pigment consisting of:

| | Per cent |
|---|---|
| Lithopone | 30 |
| Titanium dioxide | 70 | were mixed with 15½ gallons of gloss oil (60 per cent solution of resin in mineral spirits).

In normal production this is given a short mix, and then run through a 3 roll mill. It usually takes 32 minutes for a batch of this size to be run through. When 9.5 ounces (0.5 per cent) of Composition I, were added to the mix a like batch was run through in 12 minutes, giving an increase in output of 170 per cent.

This paste was then added to additional oil and solvents to make an enamel.

*Example XXIV.—Alkyd primer for steel*

| | Pounds |
|---|---|
| Red iron oxide | 116 |
| China clay | 178 |
| Solution of a phenol and oil modified alkyd resin | 156 |
| Xylol | 50 |

This mixture, after mixing, normally takes 2½ hours to run on a 5 roll mill. When 1 per cent of Composition I was added to the mix and the batch milled, in the same manner with the same setting of the rolls, the time occupied for running was an hour and a quarter. The paste was then thinned down with additional solvent to the proper consistency.

*Example XXV.—Exterior red enamel (alkyd type)*

A paste consisting of:

| | Pounds |
|---|---|
| Toluidine red | 200 |
| Long oil pure alkyd | 600 | was ground 96 hours on a pebble mill before a satisfactory fineness was obtained. This batch of paste was then thinned down to make 250 gallons of finished enamel. By adding to the above formula 20 pounds of Composition I, it was found that the same fineness was obtained after running only 48 hours. When this paste was thinned down to make up 250 finished gallons and compared with batch without Composition I, there was no detectable difference.

*Example XXVI.—Chrome green in oil*

| | Per cent |
|---|---|
| C. P. chrome green deep | 60 |
| Raw linseed oil | 40 |

Normally this material cannot be ground satisfactorily on a 5 roll mill. In fact a production run resulted in an output of but 83 pounds per hour. By using 2 per cent of Composition I, this material was ground on the same 5 roll mill at a rate of 163 pounds per hour—almost double the output.

*Example XXVII.—Burnt umber in oil*

Two like batches of the following commercial formula were mixed:

| | Pounds |
|---|---|
| Iron oxide | 1 |
| Carbon black | 1 |
| Raw soya bean oil | 20 |
| Raw linseed oil | 20 |
| Burnt umber | 58 |

This formula will not grind on a 3 roll mill but, by adding 0.5 per cent of Composition I, an output of 400 pounds per hour was obtained, while 1 per cent of Composition I gave an output of 800 pounds per hour.

*Example XXVIII.—Black half-tone ink*

A commercial formula containing:

30 per cent pigment consisting of:
  Carbon Black
  Prussian Blue
  Alkali Blue
70 per cent mixed litho oils normally grinds on a 3 roll mill at the rate of 96 pounds per hour for 2 passes.

By adding 0.8 per cent of Composition I to the same mix, it ground at the rate of 391 pounds per hour for 2 passes, the fineness being the same in both cases.

Example XXIX.—Yellow base ink 62 pounds C. P. chrome yellow mixed with 38 pounds #1 litho oil and then ground on a 5 roll mill gave a rate of 301 pounds per hour. After adding to the above batch 0.6 pound of Composition I, the output was 375 pounds per hour at same fineness, and under same mill speed.

Example XXX.—News ink

|   | Parts |
|---|---|
| Carbon black | 25 |
| Resin varnish | 5 |
| Gilsonite varnish | 5 |
| Methyl violet toner solution | 2½ |
| News ink oil (petroleum oil) | 212½ |

By introducing ½ per cent of Composition I, based on the above weight in a standard batch, the output was increased 87 per cent over normal on a regulation 3 roll mill.

Example XXXI.—White print paint

This composition is representative of the type of material used for printing felt base linoleum.

The paste consists of:

75 per cent pigment, being a mixture of:
 Zinc oxide
 Lithopone
 Blanc fixe
 Whiting
25 per cent vehicle, natural resin varnish.

Normally this material grinds on a 5 roll mill at the rate of 1192 pounds per hour. whereas by the addition of 0.8 per cent of Composition I, under identical conditions, 2103 pounds per hour were ground, and the paste was definitely finer.

Example XXXII.—White paste for lacquer

|   | Pounds |
|---|---|
| Titanium dioxide | 420 |
| Blown castor oil | 180 |
| Butyl cellosolve | 60 |

The above mixture, when ground on a 5 roll mill, gave an elapsed time of 6 hours. The addition of 8.1 pounds of Composition I reduced the grinding time for the same mill setting to 4 hours. The fineness of the dispersed pigment for both grinds was the same. Such a pigmented paste may be made into a lacquer by the addition of nitrocellulose solution, resin solution and thinner.

Example XXXIII.—Pigmented paste for lacquer

|   | Parts |
|---|---|
| Titanium dioxide | 130 |
| Dibutyl phthalate (plasticizer) | 84 |
| Shellac solution 8 pound cut | 8 |

When the above mixture was ground on a 3 roll mill, the addition of 2 per cent of Composition I to the mixture increased the mill output 26 per cent without sacrifice of fineness. When such a paste is reduced with a nitrocellulose solution, resin solution and thinner, pigmented lacquer results.

Example XXXIV.—Paint paste base

|   | Parts |
|---|---|
| Lithopone | 140 |
| Raw soya bean oil | 60 |

When grinding on a 3 roll mill, the addition of .6 per cent of Composition I, based on the weight of the paste, increased the mill productivity 74 per cent over that normally obtained without the addition. When such a paste is reduced with further vehicle and thinner, it produces a commercial paint.

Example XXXV.—Paint base

|   | Parts |
|---|---|
| Para red | 45 |
| Kettle bodied fish oil | 67 |

When grinding on a 3 roll mill, the addition of 1 per cent of Composition I increased the mill output 180 per cent with equal fineness. Such a paste, when reduced with thinner and vehicle, produces a commercial red paint.

Example XXXVI.—Pigmented paste

|   | Parts |
|---|---|
| Titanox B | 140 |
| Non-oxidizing alkyd solution | 60 |

The addition of 2½ per cent of Composition I to the above formula increased the rate of grind, on a 3 roll mill, 26 per cent over the output obtained without Composition I and with equal fineness.

Such a paste, with the proper addition of nitrocellulose solution, solvents and plasticizer, gives a pigmented lacquer.

Example XXXVII.—Pigment paste for artificial leather

|   | Parts |
|---|---|
| Titanium dioxide | 140 |
| AA castor oil | 60 |

The above mixture was ground on a 3 roll mill. The addition of 2 per cent of Composition I gave a 38 per cent increase over the output obtained without the addition and with the same fineness.

The above paste when mixed with a nitrocellulose solution and solvents produces an artificial leather coating material.

Example XXXVIII.—Flat white 77 per cent pigment which is a mixture of:
 Titanium dioxide
 Asbestine
 Whiting
 Barytes
23 per cent vehicle containing:
 20 per cent fish-linseed stand oil
 80 per cent mineral spirits Output on a 3 roll mill, without Composition I, 334 pounds per hour; with .3 per cent of Composition I, 2080 pounds per hour.

Example XXXIX.—Automotive enamel (olive drab)

This material, the vehicle of which is a spar varnish and pigmented to a typical olive drab color, is normally ground, on a 5 roll mill, at a rate of 94 pounds per hour.

The addition of 1.13 per cent of Composition I increased the output to 375 pounds per hour. Without Composition I, 3 passes over the mill were required. With Composition I, equal fineness was obtained with 2 passes.

Example XL.—Green enamel paste

Pigment: Mixture Chrome Yellow and Prussian Blue.
Vehicle: Oil varnish.

This mix, when ground on a 3 roll mill, showed an output of about 20 pounds per hour. The addition of about 1 per cent Composition I increased the output to 193 pounds per hour. This was accomplished in 1 pass whereas the paste, without such addition, had to be passed through the mill twice. The fineness of pigment distribution was the same in both cases. This was the more remarkable, as the two pigments used differ widely in ease of distribution.

In the foregoing examples we have referred to the employment of Composition I as used in various connections. It is to be understood, however, that we may use the compositions of Examples II to XVII in like manner, due care being exercised in the selection of such compositions as will be appropriate to the pigment-vehicle system in which they are to be used. Of the compositions of Examples I to XVII, our experience has shown that, for general purposes, the composition of Example I is the most efficient. Example II is nearly as good. The other examples of the compositions are not as efficient for general application; but, when intelligently used, they are operable to produce an appreciable increase in the efficiency over the results which would attend grinding operations if they were omitted.

In all of the foregoing examples, moreover, a grinding mill of some sort was employed. The mills thus used served the purpose, generically stated, of applying energy to the mass operated upon. In some cases, particularly with stiff pastes and where fine pigment subdivision is not required, such as in putties, we have found that the necessary energy to carry out the method of this invention may be applied by way of appropriate mixing apparatus. By way of example: To 50 pounds raw linseed oil, 25 pounds mineral oil, and 425 pounds of whiting there was added 1 per cent of the composition of Example II. The mass was introduced into and mixed in an ordinary putty mixer, and it was observed that the pigment distributed itself in the vehicle in one-third less time than normally required and the general appearance of the putty was much smoother.

Our experience has shown that the employment of astonishingly small amounts of the grinding aid composition will give remarkable results and of these small amounts of the complete compound, the polymer constituent forms but a part. In fact our grinding aid compounds, in quantities carrying between ¼ of 1 per cent and 2½ per cent of the polymer, based on the total weight of the paste into which it is incorporated, have produced the desired improvement or production step-up in grinding and in some cases even smaller amounts have been employed with complete satisfaction. The incorporation of greater amounts of a polymer, of the kind described, into a paint or the like is undesirable as it tends to alter the composition and properties of the finished product containing it. Paint men do not want any appreciable deviation from their standard products.

With our method, as specified, we are able to employ such small quantities of the grinding aid that the polymer constituent thereof is practically imperceptible in the finished product. In other words, paint made according to the method of this invention, does not differ, to all intents and purposes, from conventional paint made without the employment of the grinding aid, except that in some cases our ability to obtain more efficient and perfect distribution of the pigment serves to produce a better paint. The method of this invention cannot produce a paint which can be considered in any sense a rubber paint, because there can be but an infinitesimal quantity of rubber contained therein.

It will thus be apparent that in carrying out the method of this invention, the grinding aid present is used in very small quantities, wholly insufficient to noticeably change the final composition of the paint, but operating only in the steps of the method to carry out, according to our theory of operation, the mechanical operation of arresting the internal mobility of the pigment agglomerates with attendant relatively rapid distribution thereof throughout the body of the vehicle.

Trial and practice have demonstrated that we have fulfilled that demand of the paint and varnish industry and ink and allied industries for a substantially universal aid to grinding which, in some cases, has increased the output, without introducing any disadvantages, as much as tenfold over the output obtained by putting the same quantities of the standard pigment-vehicle combination through the same grinding equipment without the present invention. In over 85 per cent of the commercial trials thus far made the output has been at least doubled, and in many instances, where considered desirable, the fineness has been enhanced with an accompanying better than normal output.

We believe that the theories hereinbefore set forth are correct and explain the reasons for the phenomena and results we have described but, irrespective of these theories, we know from actual practice that the examples given are thoroughly practical and commercial. For these reasons the present invention is to be understood as fully commensurate with the appended claim.

In the foregoing detailed description we have set forth the method of this invention and the manner of its employment for the production of highly satisfactory results. Attention is now directed to the accompanying drawing which graphically shows, by way of example, and not in a limiting sense, the manner in which the present invention operates in practice to speed up production. In the drawing, Figure 1 is a diagrammatic showing of a method of making a pigment paste in accordance with prior art practice, whereas Figure 2 shows the operation of the same mill with the same settings but utilizing the method of this invention.

While it is not intended to limit this method to mill speeds or to the particular number of mill rolls, the drawing is so constituted as to be illustrative of a definite example wherein the first roll of the mill is rotating at a given speed, the second roll at a higher speed, and the third roll at a still higher speed. The roll setting in Figures 1 and 2 are identical, the speeds are identical, and the pigment vehicle systems are identical, but Figure 1 illustrates the conventional method without the use of our grinding aid, while Figure 2 illustrates our method with the use of our grinding aid.

Figure 1 exhibits a condition which is common in the manufacture of pigmented pastes. Here a vehicle and pigment, after being mixed together to form the pigment-vehicle system to be ground, are fed to the throat between the first and second rolls to form a pool 1. These rolls are so adjusted that they will feed between them a constant quantity of the material to be ground. As this material passes between the first and second rolls, it divides, one part 2 following around the first roll to return to the pool 1, while the remainder 3 is carried between the second and third rolls. Here the material 3 subdivides, a part 4 continuing around the second roll while the remainder 5 is carried along by the third roll to be removed therefrom by a scraper 6 to constitute the output of the mill. Note that in this situation the second roll does no clear, i. e., it is not bare of the material, beyond its zone of cooperation with the third roll.

Now note the different mode of operation and result evidenced in Figure 2. Here the pigment-vehicle system of the pool 1a is of the same formula as that of the pool 1, but there has been added thereto one of the grinding aids of the present invention as hereinbefore described. The presence of the grinding aid does not show up as the material passes between the first and second rolls, for it divides at 2a and 3a as before. However, when the material 3a, carried by the second roll, comes into cooperative relation with the third roll, this fast moving roll is shown as taking unto itself all of such material 3a from the second roll, leaving the upper portion of the second roll bare, and immediately delivering all of such material 3a to the scraper 6 to constitute the output of the mill.

Whereas the method of Figure 1 takes away from the third roll material fed into proximity thereto and thus retards production output, the method of Figure 2 does not so retard the output and thus speeds up production. This is true whether the mill adjustments remain the same or if the rolls are adjusted to closer relation, within of course reasonable limits for the immobilizing and distributing influences of the grinding aid in our method conditions the pigment-vehicle system for increased utilization of the grinding energy imparted through the rolls and this results in stepped up production with a finer mill setting. The mill setting can be adjusted to produce the desired division and distribution of pigment in the vehicle.

This application is a division of application Serial No. 298,156, filed October 5, 1939. The parent application contains claims to the method whereas the present case is directed to the composition used in carrying out said method and which composition may be added at any stage in the making of the pigment paste, or to any of the constituents of the pigment paste before they are subjected to subsequent milling in commingled condition.

The foregoing detailed description sets forth the invention in illustrative practical forms, but the invention is to be understood as fully commensurate with the appended claim.

Having thus fully described the invention, what we claim as new and desire to secure by Letters Patent is:

A composition for speeding up the making of pigment pastes, comprising a homogeneous solution in a volatile solvent of at least one xylol-soluble high molecular weight non-fluid polymer selected from the group consisting of xylol-soluble natural rubber and normally solid polyisobutylene, and a non-volatile water-insoluble wetting agent, said solution having a viscosity of not less than 50 centipoises and the ratio of the wetting agent to the polymer being approximately 1 : 1 to 3.

LEO ROON.
ARTHUR MINICH.